United States Patent [19]
Pojman et al.

[11] Patent Number: 6,057,406
[45] Date of Patent: May 2, 2000

[54] FUNCTIONALLY GRADIENT POLYMERIC MATERIALS

[75] Inventors: John A. Pojman, New Orleans, La.; Timothy W. McCardle, Hazlehurst, Miss.

[73] Assignee: The University of Southern Mississippi, Hattiesburg, Miss.

[21] Appl. No.: 09/128,126

[22] Filed: Aug. 3, 1998

[51] Int. Cl.[7] .................................................. C08F 2/00
[52] U.S. Cl. ............................................................ 526/87
[58] Field of Search ................................ 524/556; 526/87

[56] References Cited

U.S. PATENT DOCUMENTS

| | | | |
|---|---|---|---|
| 4,065,520 | 12/1977 | Bailey | 260/878 |
| 4,104,330 | 8/1978 | Danzig | 260/880 |
| 4,195,167 | 3/1980 | Knofe | 528/408 |
| 4,925,899 | 5/1990 | Rendina | 525/314 |
| 5,319,033 | 6/1994 | Trepka | 525/314 |
| 5,556,917 | 9/1996 | Colella | 525/71 |
| 5,614,579 | 3/1997 | Roggeman | 524/457 |
| 5,756,573 | 5/1998 | Trumbo | 524/458 |

OTHER PUBLICATIONS

"Free–radical frontal polymerization: Self–propagating thermal reaction waves" by John A. Pojman, Victor M. Ilyashenko and Akhtar M. Khan, J. Chem. Soc., Faraday Trans., 92(16), 1996, pp. 2825–2837.

"Factors Affecting Propagating Fronts of Addition Polymerization: Velocity, Front Curvature, Temperature Profile, Conversion, and Molecular Weight Distribution" by John A. Pojman, Jason Willis, Dionne Fortenberry, Victor Ilyashenko and Akhtar M. Khan, Journal of Polymer Science: Part A: Polymer Chemistry, vol. 33, 1995, pp. 643–652.

"Traveling Fronts of Addition Polymerization Fronts" by John A. Pojman, Istvan P. Nagy and Carl Salter, Journal of the American Chemical Society, vol. 115, No. 23, 1993, pp. 11044–11045.

"Thermochromic Composites and Propagating Polymerization Fronts" by Istvan P. Nagy, Laszlo Sike and John A. Pojman, Research News, Advanced Materials, vol. 7, No. 12, 1995, pp. 1038–1040.

"Organic Optical Limiter with a Strong Nonlinear Absorptive Response" J. W. Perry, K. Mansour, I.–Y. S. Lee, X.–L. Wu, P. V. Bedworth, C.–T. Chen, D. Ng, S. R. Marder, P. Miles, T. Wada, M. Tian, H. Sasabe, Science, vol. 273, Sep. 13, 1996, pp. 1533–1536.

"Effect of Convection on a Propagating Front with a Solid Product: Comparison of Theory and Experiments" by Gina Bowden, Marc Garbey, Victor M. Ilyashenko, John A. Pojman, Stanislav E. Solovyov, Ahmed Taik, and Vitaly A. Volpert, The Journal of Physical Chemistry B, Reprinted from vol. 101, No. 4, pp. 678–686.

"Numerical modeling of self–propagating polymerization fronts: The role of kinetics on front stability" by Stanislav E. Solovyov, Victor M. Ilyashenko and John A. Pojman, American Institute of Physics, CHAOS, vol. 7, No. 2, 1997, pp. 331–340.

"Single–head spin modes in frontal polymerization" by Victor M. Ilyashenko and John A. Pojman, American Institute of Physics, CHAOS, vol. 8, No. 1, 1998, pp. 285–289.

"Frontal Dispersion Polymerization" by John A. Pojman, Grady Gunn, Chilibra Patterson, Jim Owens and Chris Simmons, The Journal of Physical Chemistry B. vol. 102, No. 20, 1998, pp. 3927–3929.

"Free radical–scavenging dyes as indicators of frontal polymerization dynamics" by Jonathan Masere and John A. Pojman, J. Chem. Soc., Faraday Trans., vol. 94, 1998, pp. 919–922.

"The effect of convection on a propagating front with a liquid product: Comparison of theory and experiments" by B. McCaughey, J.A. Pojman and C. Simmons and V. A. Volpert, American Institute of Physics, Chaos, vol. 8, No. 2, 1998, pp. 520–529.

"Suppressing Convective Instabilities in Propagating Fronts by Tube Rotation" by Istvan P. Nagy and John A. Pojman, American Chemical Society, The Journal of Physical Chemistry, vol. 100, No. 8, 1996, pp. 3299–3304.

"The use of frontal polymerization in polymer synthesis" by Akhtar M. Khan and John A. Pojman, Elseview Trends Journals, TRIP, vol. 4, No. 8, Aug., 1996, pp. 253–257.

"Frontal Curing of Epoxy Resins: Comparison of Mechnical and Thermal Properties to Batch–Cured Materials" by Yuri Chekanov, David Arrington, Greg Brust and John A. Pojman, Journal of Applied Polymer Science, vol. 66, 1997, pp. 1209–1216.

"Propagating Fronts of Polymerization in the Physical Chemistry Laboratory" by John A. Pojman, William W. West and Jennifer Simmons, Journal of Chemical Education, vol. 74, No. 6, Jun. 1997, pp. 727–730.

"The True Molecular Weight Distributions of Acrylate Polymers Formed in Propagating Fronts" by John A. Pojman, Jason R. Willis, Akhtar M. Khan and William W. West, Journal of Polymer Science: Part A: Polymer Chemistry, vol. 34, 1996, pp. 991–995.

"The Phenomenon of Propagation of the Polymerization Reaction" by N. M. Chechilo, R. Ya Khvilivitskii and N. S. Enikolopyan, Translated from Doklady Akademii Nauk SSSR, vol. 204, No. 5, pp. 1180–1181, Jun. 1972. Original article submitted Nov. 9, 1971, pp. 512–513.

"Structure of the Polymerization Wave Front and Propagation Mechanism of the Polymerization Reaction" by N. M. Chechilo and N. S. Enikolopyan, Translated from Doklady Akademii Nauk SSSR, vol. 214, No. 5, pp. 1131–1133, Feb., 1974. Orginal article submitted Jul. 25, 1973, pp. 174–176.

(List continued on next page.)

*Primary Examiner*—Paul R. Michl
*Attorney, Agent, or Firm*—Howrey Simon Arnold & White, LLP

[57] ABSTRACT

Functionally gradient polymeric materials are formed by a process that utilizes an ascending polymerization front. A polymerization front is initiated in a reaction vessel containing a monomer solution. Additional monomers or resins are added on top of the polymerization front to maintain a substantially constant level. The composition of the monomers and/or additives are varied as they are added to the reaction vessel to form a functionally gradient polymeric material.

20 Claims, No Drawings

OTHER PUBLICATIONS

"Problems of Non–isothermal Character in Polymerisation Processes" by S. P. Davtyan P. V. Zhirkov and S. A. Vol'fson, Translated from Uspekhi Khimii, Russian Chemical Reviews, 53 (2), 1984, pp. 150–163.

"Some Rules Governing the Extension of the Front of Radical Polymerization of Vinyl Monomers" by G. G. Aleksanyan, Kh. A. Arutyunyan, V. L. Bodneva, S. P. Davtyan, E. V. Prut, B. A. Rozenberg, K. G. Shkadinski and N. S,. Yenikolopyan, Institute of Chemical Physics, U.S.S.R. Academy, (Received Jan. 7, 1974), pp. 1052–1059.

"Traveling Fronts of Methacrylic Acid Polymerization" by John A. Pojman, Journal of the American Chemical Society, 1991, 113, pp. 6284–6286.

"Spin mode instabilities in propagating fronts of polymerization" by John A. Pojman, Victor M. Ilyashenko and Akhtar M. Khan, Physica D 84, 1995, pp. 260–268.

"Thermochromic Composite Prepared via a Propagating Polymerization Front" by Istvan P.Nagy, Laszlo Sike and John A. Pojman, Journal of the American Chemical Society, vol. 117, No. 12, 1995, pp. 3611–3612.

"Convective Instabilities in Traveling Fronts of Addition Polymerization" by John A. Pojman, Richard Craven, Akhtar Khan and William West, The Journal of Physical Chemistry, vol. 96, No. 18, 1992, pp. 7466–7472.

"Binary Frontal Polymerization: A New Method to Produce Simultaneous Interpenetrating Polymer Networks (SINs)" by John A. Pojman, William Elcan, Akhtar M. Khan and Lon Mathias, Journal of Polymer Science: Part A: Polymer Chemistry, vol. 35, 1997, pp. 227–230.

"Frontal Polymerization in Solution" by John A. Pojman, Ginger Curtis and Victor M. Ilyashenko, Journal of the American Chemical Society, vol. 118, No. 15, pp. 3783–3784.

"Mathematical Modeling of Free–Radical Polymerization Fronts" by P. M. Goldfeder and V. A. Volpert and V. M. Ilyashenko, A. M. Khan, J. A. Pojman and S. E. Solovyov, The Journal of Physical Chemistry B, vol. 101, No. 18, 1997,pp. 3474–3482.

FUNCTIONALLY GRADIENT POLYMERIC MATERIALS

This invention was made with Government support under Contract F49620-94-1-10459P0001 awarded by the Air Force Office of Scientific Research and Contract CTS-931917 awarded by the National Science Foundation. The Government has certain rights in this invention.

BACKGROUND OF THE INVENTION

The present invention relates to polymeric materials and composites made by frontal polymerization More particularly, the present invention relates to functionally gradient polymers formed by frontal polymerization.

Functionally gradient or graded materials (FGMs) are materials whose composition varies spatially in a controlled manner. Many different methods have been devised for forming functionally gradient materials. In one such process, centrifugal force was used to prepare gradients in a carbon fiber reinforced epoxy composite to produce composites with spatially varying conductivity. Additionally, several researchers have done work on preparing gradient interpenetrating polymer networks (IPNs). Most of the work developed by these individuals involves producing a gradient by diffusing one component into another pregelled component followed by curing, or producing a gradient in the polymer using a gradient of illumination. The diffusing method can require as much as 280 hours to produce a gradient over $10\mu$. Using the absorption of light to produce a gradient is limited to polymers with a thickness less than 1 mm. None of these techniques can be used to produce gradients in polymers which are several centimeters in thickness.

Graded polymeric materials, such as Graded Refractive Index (GRIN) materials have found wide use in optical applications. These materials are prepared via interfacial gel polymerization, which is a slow process limited to producing gradients less than about 1 centimeter.

Another type of gradient material with definite utility is an optical limiter based on a gradient of nonlinear optical dye dissolved in a polymer matrix. An optical limiter is a device that strongly attenuates intense optical beams but allows high transmittance at low level light. Such a device would be very useful for protecting human eyes from intense laser pulses. A discussion of the types of organic materials that exhibits such nonlinear absorption is contained in Perry et al., "Organic Optical Limiter with a Strong Nonlinear Absorptive Response," Science, 1996, pages 1533–1536. They found that metallophthalocyanine (M-Pc) complexes containing heavy central atoms work well. These dyes are compatible with poly(methyl methacrylate) and dissolve in the monomer. This affords the great advantage of inexpensive materials.

Frontal polymerization is a method for converting monomer into polymer via a localized reaction zone that propagates through the coupling of the heat released by the polymerization reaction and thermal diffusion. Frontal polymerization was first discovered at the Institute of Chemical Physics in Chernogolovka, Russia by Chechilo and Enikolopyan in 1972. Polymerization fronts can exist with free-radical polymerization of mono- and multifunctional acrylates or epoxy curing. Frontal polymerization can be achieved in solution polymerization with monomers such as acrylamide, methacrylic acid and acrylic acid in solvents such as water and DMSO.

Frontal polymerization reactions are relatively easy to perform. In the simplest case, a test tube is filled with the reactants. The front is ignited by applying heat to one end of the tube with an electric heater. The position of the front is obvious because of the difference in the optical properties of polymer and monomer. Under most cases, a plot of the front position versus time produces a straight line whose slope is the front velocity. The velocity can be affected by the initiator type and concentration but is on the order of centimeters per minute.

The defining feature of thermal frontal polymerization is the sharp temperature gradient present in the front. The temperature can jump about 200° C. over a little as a few millimeters, which corresponds to polymerization in a few seconds at that point.

In view of the foregoing, it would be a significant advancement in the art to provide a process for forming functionally gradient polymers which had a short reaction time and which could produce polymers several centimeters in thickness. Such a process and the polymeric materials created thereby are disclosed herein.

BRIEF SUMMARY OF THE INVENTION

The present invention is directed to functionally gradient materials and a process for forming the same. In a preferred embodiment, an ascending polymerization front is created in a reaction vessel. Pumps provide monomers or resins in a controlled ratio on top of the ascending front as it propagates to maintain a nearly constant thickness of unreacted monomers. The height of unreacted monomers is maintained such that the front is not extinguished, but progresses in a controlled manner. By varying the ratio of the monomers and/or the concentration of additives to the mixture, functionally gradient materials can be formed.

DETAILED DESCRIPTION OF THE PREFERRED EMBODIMENTS

The present invention is directed to functionally gradient materials and methods for forming them.

As discussed above, frontal polymerization reactions are generally relatively easy to perform. In the simplest case, a test tube is filled with reactants and a front is ignited by applying heat to one end of the tube. The front then either ascends up the tube or descends down the tube, depending upon the point at which it was initiated. In a preferred embodiment of the present invention, the process is carried out in a cylindrical tube such as a test tube. However, it should be appreciated that reaction vessels having different cross-sectional areas can also be used.

In the preferred embodiments, the cross-sectional area can vary from about 15 mm$^2$ to about 1 m$^2$. The limiting factors on the upper end of the area are dependent in part upon the ability to simultaneously add additional reactants to the entire surface area and the ability of the front to progress in a uniform manner.

According to the preferred embodiment of the present invention, the polymerization front is an ascending front in a vertical container. However, it will be appreciated by those skilled in the art that other configurations can also be used without departing from the spirit or scope of the invention. For example, the reactor may be tilted or possess a varying cross section.

Frontal polymerization is often carried out at ambient temperature with the heat of reaction being sufficient to sustain the reaction as the front progresses through the material. However, in some systems it may be necessary to preheat the reactants or to provide additional localized heat as the front progresses to maintain the polymerization reaction.

The process of the present invention can be utilized to make many different types of functionally gradient polymers. In one preferred embodiment, the functionally gradient polymer comprises a polymer matrix having an optical dye dissolved therein. The concentration of the dye varies along the length of the polymer sample. This is achieved by varying the amount of dye added to the monomer that is added to the top of the polymerization front. It will be appreciated by those skilled in the art that there are many different ways of varying the concentration of the dye. For example, the dye can be added by a separate pump as the monomer is being added such that its concentration gradually changes, by varying the relative flow rates of the two feedstreams. Alternatively, the dye solution can be premixed with the monomer in the inlet reservoir by a separate pump such that the inlet stream's dye concentration varies with time.

Many different types of dyes and additives can be used in the present invention. Examples of additives include plasticizing agents, rubber toughening agents and inert fillers. The latter can be affected to great advantage because the rapid reaction in the front prevents sedimentation of the filler. For example, diethyl phthalate can be used to prepare a gradient of plasticization. Rubber particles (from ground car tires) or poly (butadiene) can be used as rubber toughening agents. Silica gel or calcium carbonate can be used as inert fillers.

In another preferred embodiment of the present invention, functionally gradient polymers in which the mechanical properties of the polymer vary along the length are formed. In one embodiment, the mechanical properties of the polymer are modified by varying the amount of cross-linking that occurs in the polymer. This can be achieved by changing the ratio of monomers that are added to the system or by varying the amount of cross-linking agent that is added to the system. Examples of suitable systems include multifunctional acrylates with a monoacrylate and/or an epoxy resin with its curing agent. Polymeric materials with a gradient in the copolymer composition can be achieved by varying the comonomer feedstreams.

The invention can be further understood by reference to the following examples:

EXAMPLE 1

Tri(ethylene glycol) dimethacrylate (TGDMA) and benzyl acrylate were used as monomers in a polymerization reaction. They were stored over molecular sieves, dried over $CaH_2$ and then filtered before use. Lupersol 231 was used as an initiator. A peristaltic pump was used to supply the monomers into a test tube having an inner diameter of 22 millimeters in which an ascending front was propagated. The polymerization reaction was initiated by heating the bottom of the test tube with an electric heater. The ratio of the monomers was varied from 100% TGDMA/0% benzyl acrylate at the beginning to 5% TGDMA/95% benzyl acrylate at the end. The sample diameter was 2.2 cm and its length 10 cm. The flow rate of monomers into the test tube was 3 mL/minute.

The characteristics of the resulting functionally gradient polymer were a rigid material at the high TGDMA end smoothly graded into a rubbery, crosslinked material at the low TGDMA concentration.

EXAMPLE 2

Tri(ethylene glycol) dimethacrylate (TGDMA) was used as the monomer in a polymerization reaction. Tricaprylmethylammonium persulfate was used as an initiator in this experiment producing dye gradients. The main advantage of this initiator is its gasless nature under decomposition. This permitted the formation of bubble-free optical materials.

Aluminum phthalocyanine chloride was used as a dye. The dye was dissolved in the TGDMA, and the solution was used as a coloring component. A peristaltic pump was used to supply the reactive material into a test tube in which an ascending front was propagated. The inner diameter of the test tube was 12 mm. The test tube was exposed to ambient pressure and temperature conditions. The dye concentration was gradually increased in the TGDMA reservoir as the monomer was added to the system until it reached its saturation point.

The dye concentration varied in the final sample from saturated (dark green) to zero over a distance of 5 cm.

The process of the present invention can be utilized in many different types of polymer systems such as reactive acrylates, acrylamides in solution, and cationically and amine cured epoxies. The process will work with essentially any polymer system that will support frontal polymerization. It can be used for graded IPNs using binary frontal polymerization as well as graded rubber toughened epoxies using frontal curing.

While the present invention has been described with respect to the presently preferred embodiments, numerous changes and substitutions can be made to the products and processes of the present invention without departing from the scope of the invention. Accordingly, all changes or modifications which come within the meaning and range of equivalency of the claims are to be embraced within their scope.

What is claimed is:

1. A process for forming a functionally gradient polymeric material by frontal polymerization comprising:
    initiating a polymerization front in a monomer solution in a reaction vessel;
    adding additional monomer solution to the reaction vessel ahead of the front; and
    varying the composition of the monomer solution as it is added to the reaction vessel.

2. A process for forming a functionally gradient polymeric material as defined in claim 1 wherein the front is an ascending front.

3. A process for forming a functionally gradient polymeric material as defined in claim 2 wherein a substantially constant level of monomer solution is maintained on top of the polymerization front.

4. A process for forming a functionally gradient polymeric material as defined in claim 1 wherein the composition of the monomer solution is modified by changing the amount of an additive added thereto.

5. A process for forming a functionally gradient polymeric material as defined in claim 4 wherein the additive comprises an optical dye.

6. A process for forming a functionally gradient polymeric material as defined in claim 1 wherein the monomer solution comprises two reactants.

7. A process for forming a functionally gradient polymeric material as defined in claim 6 wherein the composition of the monomer is varied by changing the ratio of the reactants.

8. A process for forming a functionally gradient polymeric material as defined in claim 1 wherein the monomer solution includes a plasticizing agent.

9. A process for forming a functionally gradient polymeric material as defined in claim 1 wherein the monomer solution includes a rubber toughening agent.

10. A process for forming a functionally gradient polymeric material as defined in claim 1 wherein the monomer solution includes an inert filler.

11. A process for forming a functionally gradient polymeric material as defined in claim 1 wherein the monomer solution is preheated.

12. A functionally gradient polymeric material produced according to the process of claim 1.

13. A process for forming a functionally gradient polymeric material by frontal polymerization comprising:

initiating an ascending polymerization front in a monomer solution containing an optical dye, in a reaction vessel;

adding additional monomer solution to the reaction vessel ahead of the front; and varying the concentration of the optical dye in the monomer solution as it is added to the reaction vessel.

14. A process for forming a functionally gradient polymeric material as defined in claim 13 wherein a substantially constant level of monomer solution is maintained on top of the polymerization front.

15. A process for forming a functionally gradient polymeric material by frontal polymerization comprising:

initiating a polymerization front in a monomer solution containing a plurality of reactants in a reaction vessel;

adding additional monomer solution to the reaction vessel ahead of the front; and varying the ratio of the reactants of the monomer solution as it is added to the reaction vessel.

16. A process for forming a functionally gradient polymeric material as defined in claim 15 wherein a substantially constant level of monomer solution is maintained on top of the polymerization front.

17. A process for forming a functionally gradient polymeric material as defined in claim 15 wherein said monomer solution includes a plasticizing agent.

18. A process for forming a functionally gradient polymeric material as defined in claim 15 wherein said monomer solution includes a rubber toughening agent.

19. A process for forming a functionally gradient polymeric material as defined in claim 15 wherein said monomer solution includes an inert filler.

20. A function gradient polymeric material containing an optical dye in which the concentration of the optical dye varies over a distance greater than about 1 centimeter.

* * * * *

UNITED STATES PATENT AND TRADEMARK OFFICE
CERTIFICATE OF CORRECTION

PATENT NO. : 6,057,406
DATED : May 2, 2000
INVENTOR(S) : John A. Pojman and Timothy W. McCardle It is certified that error appears in the above-identified patent and that said Letters Patent is hereby corrected as shown below:

Column 6, line 20 (Claim 20), delete the word "function" and insert -- functionally --.

Signed and Sealed this

Twenty-seventh Day of February, 2001

Attest:

NICHOLAS P. GODICI

Attesting Officer

Acting Director of the United States Patent and Trademark Office